July 13, 1937.  H. H. GORDON  2,087,029
LIGHTING SYSTEM
Filed Feb. 19, 1931  4 Sheets-Sheet 1

Inventor
Hayner H. Gordon
By Braselton, Whitcomb & Davies
Attorneys

July 13, 1937.  H. H. GORDON  2,087,029
LIGHTING SYSTEM
Filed Feb. 19, 1931   4 Sheets-Sheet 2

Inventor
Hayner H. Gordon
By Braselton, Whitcomb & Davis
Attorneys.

July 13, 1937.  H. H. GORDON  2,087,029
LIGHTING SYSTEM
Filed Feb. 19, 1931  4 Sheets-Sheet 3
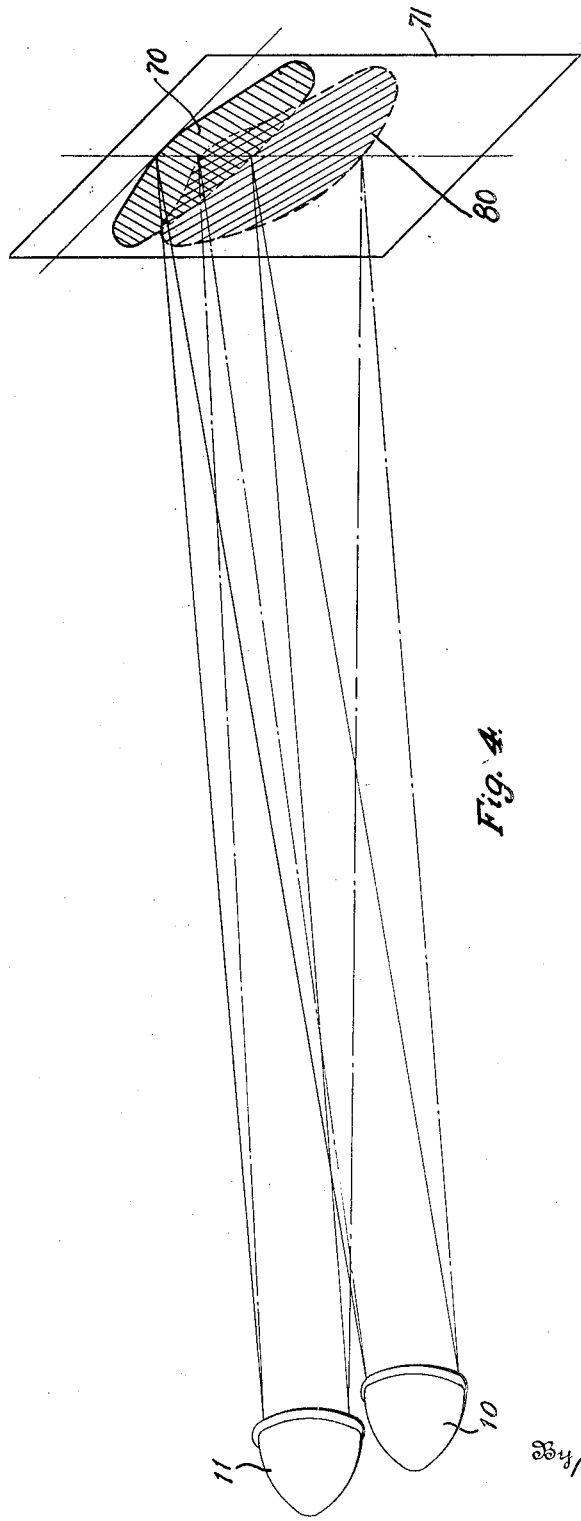
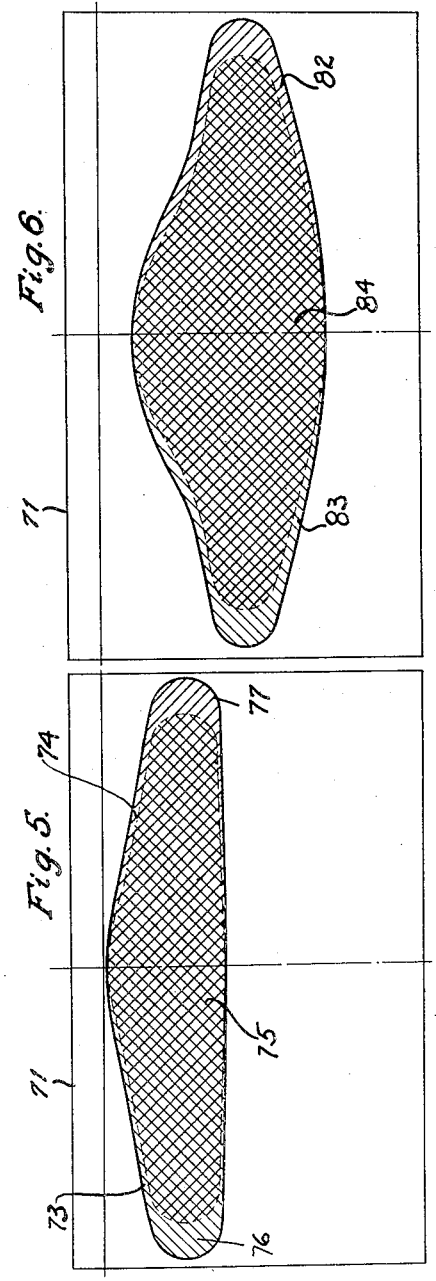
Inventor
Hayner H. Gordon
By Braselton, Whitcomb Davies
Attorneys

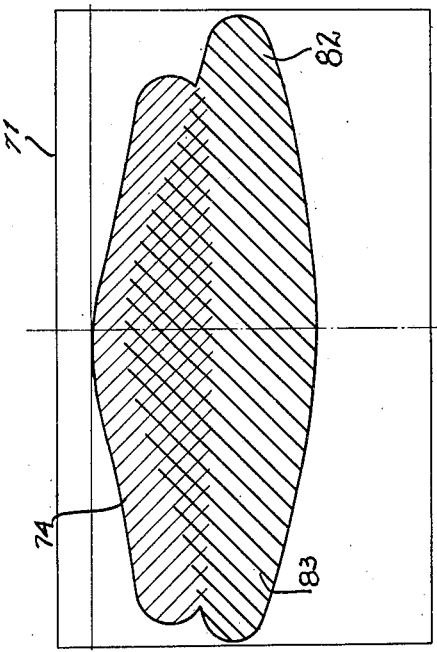
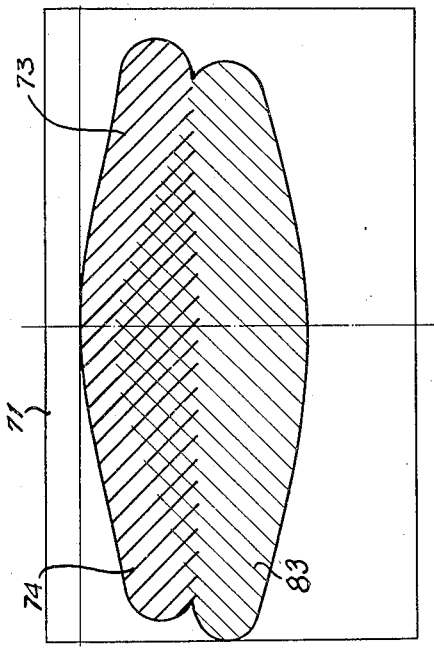
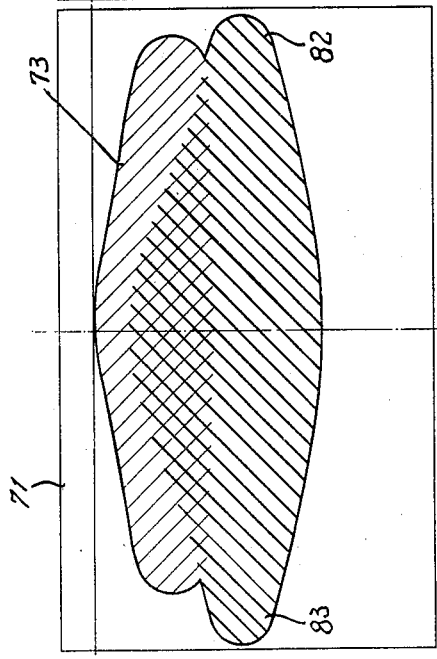
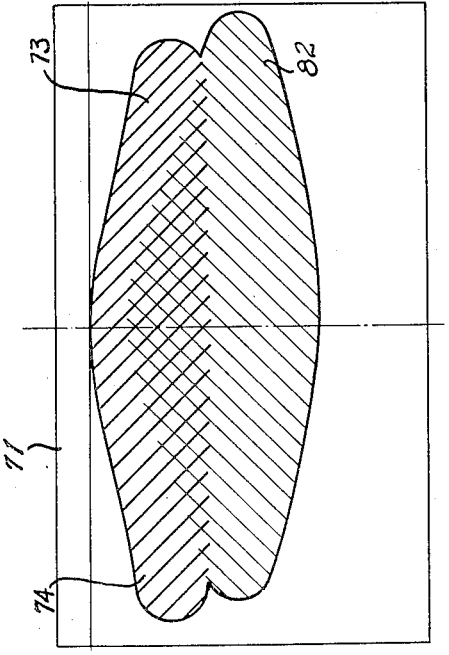

Patented July 13, 1937

2,087,029

UNITED STATES PATENT OFFICE 2,087,029

LIGHTING SYSTEM

Hayner H. Gordon, Washington, D. C., assignor to Lite Watchman Corporation, New York, N. Y., a corporation of Delaware Application February 19, 1931, Serial No. 517,063

3 Claims. (Cl. 177—311)

This invention relates to a lighting system and has particular application to electric lighting systems used in connection with moving vehicles.

The invention has for one of its principal objects the provision of means rendered effective by failure of one of the light sources for indicating that such failure has occurred.

The invention embraces the provision of means for visually indicating as, for example, by modifying the light beam projected from the light source when one of the illuminants becomes ineffective.

A further object of the invention includes the provision of means for audibly or otherwise indicating when abnormal conditions exist in the lighting system.

The invention comprehends the provision of means rendered effective by the failure of one of the light sources in use for increasing the intensity or normal power of the light beam projected during normal operation of the system.

The invention also includes as one of its objects an automatic safety control for the electric lighting system of automotive vehicles including an arrangement for the circuits of the system, the same being of such nature that failure of the active light source will automatically bring into operation another source to take its place.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure 4 is a view illustrating the projection of the light beams or patterns produced by the several light sources;

Figure 5 is a view illustrating the beam projection or pattern produced by one set of light sources;

Figure 6 is a view illustrating the beam projection or pattern produced by another set of light sources;

Figure 7 is a view illustrating the pattern of composite beam resulting from overlapping of beam patterns due to failure of one of the light sources;

Figure 8 is a view similar to Figure 7 showing the resultant beam pattern upon failure of a different light source;

Figure 9 is a view similar to Figures 7 and 8 illustrating the resultant beam pattern upon failure of a third light source;

Figure 10 is a view similar to Figure 9 illustrating the resultant pattern upon failure of a fourth light source.

Figure 2:
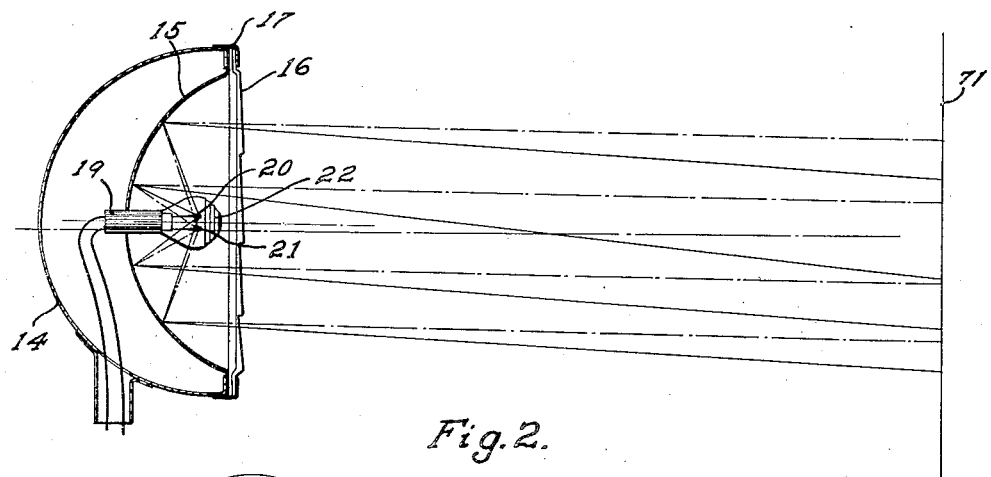
Figure 2 is a side sectional view through a headlamp illustrating diagrammatically the light rays produced from two separately energized sources of light.
Figure 1:
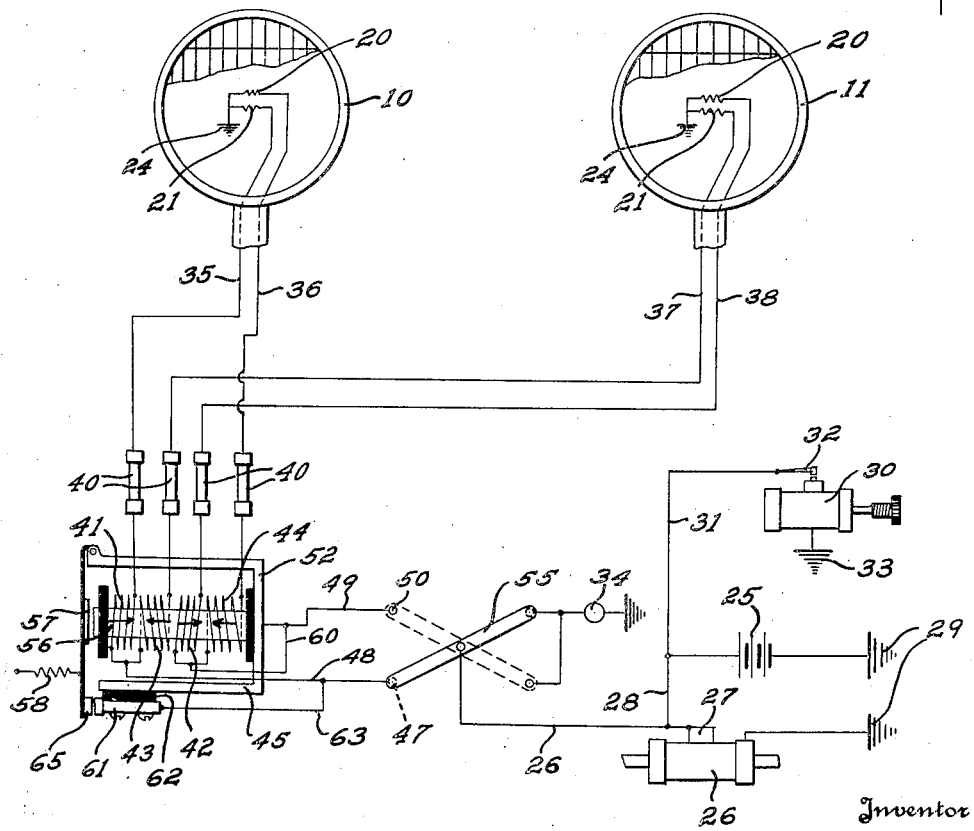
Figure 1 is a diagrammatic view illustrating a lighting system and circuit arrangement embodying a form of the device of my invention.

As a practical application of my invention, I have illustrated a form of my device as incorporated in a lighting system for vehicles, but it is to be understood that I contemplate the use of my invention with other systems or in any place where the same may be found to be applicable. Referring particularly to Figures 1 and 2 of the drawings, numerals 10 and 11 represent respectively the right and left hand headlamps with respect to the operator of the vehicle. Each headlamp consists of an exterior shell 14 which houses a suitable substantially parallelizing reflector 15, the front of the lamp being enclosed by means of a lens 16 preferably prismatic in character for reasons to be hereinafter stated, the lens being held in place by means of an annular escutcheon 17. Positioned within the reflector 15 is a socket 19 which forms a suitable support for a lamp bulb 22. The lamp bulb 22 in the embodiment illustrated is provided with two spaced light sources 20 and 21 which are preferably adapted to be selectively energized and are positioned with respect to the reflector or lens to produce independent light beam patterns of substantially the same intensity.

In a headlamp of the character illustrated, one source of light or filament when energized produces a distant or driving beam to be utilized particularly for country driving or when the vehicle is travelling at comparatively high speeds, the other filament or light source being energized for slow speed or town driving, the beams from the latter mentioned filament being deflected downwardly and intercepting the road at a point comparatively close to the car with respect to the other beam.

In the embodiment shown, the filament 21 which produces the distant beam is located substantially at the focus of the reflector while the filament 20 which is preferably positioned above the filament 21 when energized, produces a downwardly deflected or tilted beam, the light rays produced by the filaments being illustrated in Figures 2 and 4, and the beam patterns projected being particularly shown in Figure 5 and 6.

It is well known that the filaments of electric lamp bulbs now in use are quite susceptible to disruption or breakage due to jar or vibration set up because of movement of the vehicle and that they are also liable to "burn out" through normal use. It is quite common when one set of filaments is energized to see automobiles with only one headlight illuminated of which fact the operator or driver of the vehicle is not in many instances fully aware. In other instances, while aware of such condition, traffic situations or lack of tools to remove the front of the headlamp or absence of extra lamp bulbs will prevent the immediate removal of the burned out bulb and the replacement of a new one.

The operation of the vehicle when only one headlamp is illuminated is rather dangerous both to the driver of the vehicle and to drivers of approaching vehicles, as it is impossible to determine whether one light signifies the approach of a motorcycle or of an automobile, and furthermore it is impossible to ascertain whether it is the right or the left headlamp which is illuminated and, therefore, impossible to determine or gauge the amount of space to be given the approaching vehicle.

To obviate such difficulties and render driving conditions more safe, I have provided means in the electric lighting system for alleviating such dangerous driving conditions. The wiring diagram shown in Figure 2 illustrates a typical embodiment for carrying out the objects of my invention, and it comprises a source of current supply as, for example, storage battery 25 and a generator 26 driven by the engine and preferably connected to the storage battery 25 through a cut-out 27 and a wire 28, the battery and generator being grounded as at 29 to form a return circuit. Also associated with the system is the starting motor 30 deriving its energy from the storage battery 25 by suitable leads 31 and switch 32, also being grounded as at 33 to provide suitable return connection. The filaments 20 and 21 of the headlamps are suitably connected by means of leads 35, 36, 37 and 38 through fuses 40 for protecting the system to the four windings 41, 44, 43 and 42 of the relay 45 and these windings are in turn connected by means of a switch 55 preferably of manually operated type for selectively connecting each set of filaments in the headlamps to the source of electrical energy. The return circuit for the filaments is obtained through a suitable ground connection diagrammatically illustrated in Figure 1 as at 24. A tail light 34 for the vehicle is connected through the medium of the switch 55 to receive its energy from the storage battery 25 or other current supply irrespective of the position of the switch 55.

In the embodiment illustrated the four windings of the relay 45 have substantially the same number of turns and windings 41 and 42 are wound in the same directions while windings 43 and 44 are wound in the same direction with respect to each other but in opposite directions with respect to the above two mentioned windings. Windings 41 and 43 have one end of each connected to a switch point 47 by means of a lead 48, while the end of the windings 42 and 44 are interconnected and connected to the switch point 50 by means of lead 49. It will be obvious from the foregoing description that movement of switch 55 from its full line position to its dotted line position, as indicated in Figure 1, will selectively or alternately connect the separate sets of lamp filaments 20 and 21 and the respective relay windings connected in the circuit with the current supply by means of leads 26 and 28. The relay 45 comprises essentially a frame 52 which carries a core 56, the latter supporting the windings 41, 42, 43 and 44. Pivoted adjacent one end of the frame 52 is a movable armature 57 which is normally held in its outermost position by means of a spring 58. The armature carries a contact 65 which cooperates in a manner to be hereinafter explained with a stationary contact 61 suitably insulated from the relay frame 52. The contact 65 is connected through the armature 57, relay frame 52 and leads 49 to switch stud 50. A stationary contact 61 suitably insulated from the frame of the relay by means of material 62 is connected by means of leads 63 and 48 to the switch stud 47. The relay 45 can be mounted in any desired position in the vehicle, but preferably mounted adjacent the driver's seat for purposes to be hereinafter explained.

The operation of my device is such that when the switch lever 55 occupies the position illustrated in full lines in Figure 1, energy is supplied to the lower filaments 21 of each of the headlamps through windings 41 and 43 of the relay. Due to the direction of the windings and current flow therein, the electro-magnetic forces set up in the relay will be neutralized and no movement of the armature will take place irrespective of voltage variations of the current supply. When the lower filaments 21 are energized, the substantially superposed beam pattern produced by each of the filaments corresponds to the projected pattern 70 as it would appear on a screen indicated at 71 positioned substantially at right angles to the horizontal axes of the headlamps. The light beam pattern produced by each headlamp is superposed, Figure 5 illustrating the super-position of beam pattern of light emanating from each headlamp when the lower filaments 21 are energized producing the distance or driving beam, the pattern of the left hand lamp being indicated at 73, the pattern of the right hand lamp being indicated at 74 and the super-imposed or common portions of the light patterns produced by both lamps being indicated by the cross hatching resulting from the opposite diagonal cross-sectioning of the respective beam patterns 73 and 74. It should be noted in this connection that the portion indicating the decreased intensity of light portions 76 and 77 are due to the non-congruent portions of the light patterns produced, as the left hand headlamp produces the portion 76, while the right hand headlamp produces the portion 77.

When the switch 55 is moved to the position shown in dotted lines in Figure 1, current will pass through relay windings 42 and 44, thus energizing the upper filaments 20 of each headlamp producing the downwardly deflected or tilted light beam, the pattern of which is indicated at 80 of Figure 4 upon screen 71, the respective patterns of the right and left headlamps being indicated in Figure 6, the right hand headlamp producing pattern 82, the left hand headlamp producing pattern 83 and the superposed beam pattern or congruent beam pattern indicated at 84, the respective patterns of the two headlamps being non-congruent as has been hereinbefore explained with respect to the light patterns illustrated in Figure 5.

The above is the operation of the system under normal conditions. In the event that one of the filaments is rendered ineffective by being broken or otherwise disabled which would normally be energized because of the position of the switch 55; one of the windings of the relay which is in series with the disabled filament will not be subject to current flow while its opposed winding energizing the other filament will produce an electro-magnetic flux in the relay which is effective to attract the armature 57, closing the contacts 61 and 65, thus completing the circuit which immediately and automatically energizes the other set of filaments to set up illumination of both headlamps, yet at the same time. the beam pattern as will hereinafter be explained is illustrated in Figures 7 to 10 inclusive. In this connection, it should be noted that when one filament burns out in one of the headlamps in the particular embodiment shown, the remaining three filaments will be energized. When the switch 55 has been moved to the other position, if a filament should become disabled, the same condition would exist but a different winding in the relay would be rendered ineffective yet the ultimate result would be the same.

For sake of illustration, assuming that the lower filaments are energized and that the lower in the right hand headlamp becomes disabled, the winding 41 connected in series therewith is rendered inactive due to the fact that no current is flowing therein. The electro-magnetic force produced in winding 43 will set up a magnetic field in core 56 to attract armature 57 against the tension of spring 58 and close contacts 65 and 61 completing the auxiliary circuit from the source of supply by means of leads 48 and 63, contacts 61 and 65, armature 57, frame 52, lead 60, windings 42 and 44 connected respectively to upper filaments 20 by means of leads 36 and 38, thus energizing the two upper filaments in addition to the left hand lower filament which is already energized. It should be noted that the windings 42 and 44 are then in circuit and as they are in opposition, any electro-magnetic flux produced by the energization of these windings will be neutralized so that the unbalanced condition still exists in the relay because of the current flow through winding 43 which holds armature 57 and contact 65 in engagement with contact 61. In this condition the composite beam pattern produced by the system corresponds to the beam pattern illustrated in Figure 8.

With the switch 55 in the position indicated in dotted lines in Figure 1, assuming that the upper filaments are energized and that the upper filament in the left hand headlamp becomes disabled, the winding 42 connected in series therewith is rendered inactive due to the fact that no current is flowing therein. The electro-magnetic force produced in winding 44 connected in circuit with the other upper filament will set up a magnetic field in core 56 to attract armature 57 and close contacts 65 and 61 completing the auxiliary circuit from the source of supply by means of leads 49, frame 52 connected therewith, armature 57, contacts 65 and 61, leads 63 and 48, windings 41 and 43 connected respectively to lower filaments 21 by means of leads 35 and 37, thus energizing the two lower filaments, in addition to the right hand upper filament which is already energized. It should be noted that the windings 41 and 43 are then in circuit and as they are in opposition, any electro-magnetic flux produced by the energization of these windings will be neutralized so that the unbalanced condition still exists in the relay because of the current flow through winding 44 to hold the armature 57 and contact 65 in engagement with contact 61. In this condition, the composite beam pattern produced by the system corresponds to the beam pattern illustrated in Figure 9.

The light beams produced by four possible abnormal conditions resulting from the selective disability of each of four filaments are illustrated in Figures 7 to 10 inclusive. Figure 7 particularly illustrates the modified light beam pattern produced when the lower filament of the left hand headlamp is disabled. Such disability automatically brings into operation the upper filaments of both headlamps in addition to the lower filament already in operation the three light beams being indicated by patterns 73, 82 and 83, the beam patterns 82 and 83 being illustrated in heavy lines to show the greater intensity resulting from the energization of the upper filaments while the beam pattern 73 is illustrated in light lines indicating a beam from one filament only.

Figure 8 illustrates a beam pattern very similar to Figure 7 and indicates the composite pattern produced when the lower filament of the right hand headlamp is disabled. It is, thereby noted that the distant or driving beam pattern of the left hand headlamp and designated 74 has shifted to the left hand side of the common beam axis.

Figure 9 illustrates the beam pattern condition when the upper filament of the left hand headlamp has burned out or become disabled causing a shifting of the beam pattern 82 to be shifted to the right of the beam axis.

Figure 10 illustrates a similar condition although reversed when the upper right hand filament becomes disabled causing a shifting of the beam pattern 83 to the left of the beam axis. Thus it will be apparent that a disabled or burned out filament in either of the headlamps will distinctively change the contour of the beam pattern as well as the intensity of the same in some portions thereof. Thus a visual indication will be apparent to the operator of the vehicle that certain of the filaments have become disabled or that some other abnormal condition is present in the system. By noting the nature or contour of the beam produced and the intensity of the same, he will at once be apprised of an abnormal condition of his lighting system and will also be able to determine which filament has become disabled.

The employment of the circuit and means associated therewith hereinbefore described under certain abnormal conditions in the lighting system produces an audible indication. As hereinbefore pointed out, when one of the filaments of a headlamp or the circuit for the same becomes ineffective, the remaining filaments, as the case may be, due to the circuit connection become active and a beam pattern of certain peculiar shape and intensity is produced. If both of the filaments of one of the headlamps burn out or become inactive, or if their circuits are disabled, the coaction of the several magnetic fields acting in the armature 57 of the relay 45 together with the spring member 58 adapted to normally retain this armature in the open position will cause a rapid vibration of the armature from the open to the closed positions or vice versa and consequently audible vibratory noises or sounds produced.

For sake of illustration, if the lower filaments are energized by connecting the same through the windings of the relay to the source of energy, the switch 55 being in the position indicated in full lines, it will be noted that if the lower filament 21 of the right headlamp becomes ineffective, the electro-magnetic flux produced by winding 43 connected to the lower filament of the left headlamp will attract armature 57 thereby closing the contacts 65 and 61 and establish an auxiliary circuit by means of current flowing through lead 63, stationary contact 61, movable contact 65, armature 57, frame of the relay 45 and lead 60, which in turn connects windings 42 and 44 with the source of energy, and the upper filaments are thus energized, the composite beam pattern produced under this condition being similar to the one illustrated in Figure 8. Due to the fact that the windings 42 and 44 are in opposite directions, the armature will not be affected by the flux produced by those windings, and coil 43 acts to hold the armature in closed position. If, however, the upper filament 20 of the right headlamp becomes ineffective or burns out, the circuit of the winding 44 is interrupted and no electro-magnetic flux is produced by said winding in the core 56 of the relay. It then will be noted that the resultant magnetic flux acting on armature 57 and core 56 is neutralized as the magnetic fields produced by windings 43 and 42 are in opposition and no resultant flux acts in armature 57 to overcome the tension of the spring 58 which, due to the retractive force of said spring, will interrupt the auxiliary circuit by opening contacts 61 and 65. In this condition, it will be seen that the lower filament of the left headlamp will be energized while the armature is in the open position and that immediately the auxiliary circuit is closed due to the magnetic flux produced by winding 43 in circuit with this filament, which winding will attract armature 57, but due to the neutralization of the magnetic fields then present on account of the connection of winding 42 which produces a flux in opposition to winding 43, the retractive force of the spring will move the armature to the normal open position producing by this action a vibratory movement of the armature resulting in a sound or audible indication. This condition will be present until a new bulb replaces the disabled one or the circuit is repaired.

Figure 3:
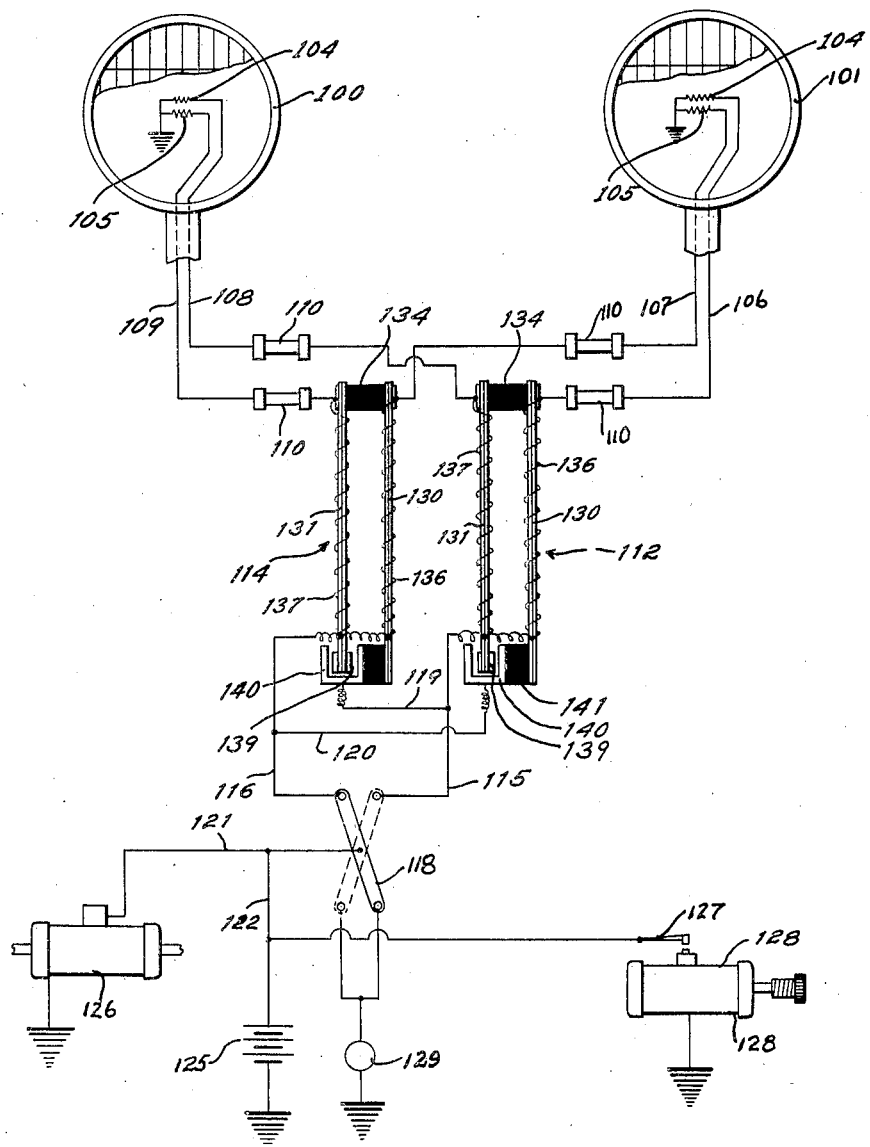
Figure 3 is a diagrammatic circuit arrangement illustrating a modified form of a circuit controlling means of my invention.

In the modified arrangement illustrated in Figure 3, the headlamps designated 100 and 101 are provided with suitable sets of upper and lower filaments designated respectively 104 and 105 and which are connected by means of leads 106, 107, 108 and 109 through fuse blocks 110 to thermo-responsive devices 112 and 114, which are in turn connected through leads 115, 116, two-way switch 118, the latter in turn connected to a source of energy as, for example, a battery 125 or a generator 126 through the medium of leads 121 and 122. The return circuit is completed through suitable illustrated ground connections. A starting motor 128 is connected through the medium of a switch 127 to the source of energy and a tail light 129 is also included in circuit with the switch 118 and is energized irrespective of the position of switch 118.

The thermostatic devices are substantially of the same construction, each one comprising a pair of substantially parallel bars of bi-metallic, thermo-responsive material 130 and 131 which are suitably mounted upon insulating block 134, each bar being surrounded by windings 136 and 137. The windings of one thermostatic device are connected in series with the upper filaments, while the windings of the other thermostatic device are connected with the lower filaments in the circuit illustrated. The bars 131 of each thermostatic device are movable at their lower ends and carry a contact element 139 arranged within the bight of a U-shaped member 140 which is suitably supported by means of an insulating block 141 secured to the lower end of the other bar 130. Both thermo-responsive bars 130 and 131 of each thermo-responsive element have substantially the same co-efficient of expansion or expansible characteristics. It should be noted that as the windings 136 and 137 are of substantially the same number of turns, the heat generated by the current flow in each winding is substantially the same when either set of filaments is energized. It should be noted that under normal conditions when a set of filaments are energized and both burning, no relative movement of the thermo-responsive elements 130 and 131 will take place as both will move substantially the same distance and in the same direction. It should be noted that the lower ends of each set of windings are interconnected and at the same time connected with the contact 139 carried by bar element 131.

Should any part of the circuit become impaired or if a filament should become disabled or burn out, such an abnormal condition acting through the thermo-responsive elements causes the other set of elements to become immediately energized. For example, if the lower filaments of each of the headlamps are energized by having the switch 118 in the position illustrated in full lines, a circuit will be established from the source of energy by means of lead 116 connected to windings 136 and 137 which in turn are connected by means of leads 107 and 109 to the lower filaments of each of the headlamps, the return circuit being established through the ground connections illustrated in Figure 3. If, however, the lower filament of the right hand headlamp 100 becomes disabled or is burned out or the circuit thereof impaired, the current flow through winding 137 will be discontinued and the heat generated thereby will not affect the bi-metallic member 131. This member will immediately move to its normal position and as the other bar 130 has moved under the influence of the heat generated in the winding 136, contact 139 carried by bar 131 will engage one leg of the U-shaped member 140, thus establishing a circuit connection through leads 119 and 115 thus connecting the windings of the other thermo-responsive device into the circuit and establishing a circuit from the source of energy to the upper filaments which will be immediately illuminated, the beam pattern produced by such illumination being illustrated in Figure 8.

From the foregoing description of the operation of the circuit, when the lower left hand filament burns out a similar abnormal condition exists in the thermo-responsive element, but in this case the bi-metallic member 130 moves with respect to the bi-metallic member 131 because of the difference in temperature affecting the thermo-responsive members such that the other set of filaments will be immediately energized and a composite beam pattern similar to the one in Figure 7 will take place. The relative movement of the thermostatic member serves to establish the auxiliary circuit above described. The same action will take place in the other thermostatic member 112 when either of the upper filaments become disabled or are burned out or the circuits impaired. The composite beam pattern produced when the upper filaments are energized and one of them becomes disabled or burns out corresponds to the one illustrated in Figures 9 and 10. The auxiliary circuit established by the thermostatic device 112 comprises movable contact 139, one leg or portion of the U-shaped member 140, lead 120 connected to said U-shaped member and in turn connected to lead 116, the windings 136 and 137 or relay 114, and the leads 109 which in turn are connected to the lower filaments 105 of the headlamps, the return circuit being established through the ground connection diagrammatically illustrated.

It is apparent that, within the scope of the invention modifications and different arrangements may be made other than is herein disclosed, and the present disclosure is illustrative merely, the invention comprehending all variations thereof.

What I claim is:—

1. In a lighting system for automobiles, a plurality of head lamps; an electric lamp bulb for each of said head lamps, each lamp bulb having two filaments; current conducting means for said filaments forming two independent circuits capable of separate energization, each circuit including a filament of each of said lamp bulbs; a source of current; switching means for selectively connecting said source of current in either of said independent circuits; and an automatically actuated switching means operating to produce audible sound upon interruption of current supply to both filaments of either lamp bulb.

2. In a lighting system for automotive vehicles, in combination two head lamps; a pair of light sources in each of said head lamps; a source of unidirectional electrical energy; current conducting means for said light sources forming two independent circuits capable of separate energization, each circuit including a light source from each of said head lamps; switching means for selectively connecting said source of energy in either of said independent circuits; an electromagnetic means forming part of said independent circuits and operating to produce audible sound upon interruption of current flow through both light sources in one of said head lamps.

3. In combination, a source of current supply; a pair of spaced illuminating units; a pair of spaced light emitting filaments located in each of said illuminating units; current conducting means for said filaments forming two independent circuits capable of separate energization, each of said circuits including a filament of each illuminating unit; switch means for selectively connecting said current source in either of said independent circuits; means forming part of said circuits automatically operable, upon cessation of current flow to one of the filaments in the circuit selectively connected to the source, for connecting the other circuit to the source of current supply; said automatically operating means being arranged to produce audible sound upon cessation of current flow through the pair of filaments located in one of said illuminating units.

HAYNER H. GORDON.